United States Patent [19]

Kawakubo et al.

[11] Patent Number: 5,671,052
[45] Date of Patent: Sep. 23, 1997

[54] OPTICAL ENCODER

[75] Inventors: Isao Kawakubo, Hino; Eiji Yamamoto, Ome, both of Japan

[73] Assignee: Olympus Optical Co., Ltd., Tokyo, Japan

[21] Appl. No.: 402,637

[22] Filed: Mar. 13, 1995

[30] Foreign Application Priority Data

Mar. 15, 1994 [JP] Japan ............................ 6-043656
Feb. 20, 1995 [JP] Japan ............................ 7-030938

[51] Int. Cl.$^6$ ........................................... G01B 11/14
[52] U.S. Cl. ........................ 356/373; 356/374; 356/376
[58] Field of Search ............................ 356/376, 374, 356/373; 257/82, 79, 80, 81

[56] References Cited

U.S. PATENT DOCUMENTS 3,881,113  4/1975  Rideout et al. .................... 257/82
5,129,725  7/1992  Ishizuka et al. ................... 356/374

FOREIGN PATENT DOCUMENTS 62-200224  9/1987  Japan .

OTHER PUBLICATIONS

Nikkei Mechanical, Jul. 1988; pp. 54–62.

Primary Examiner—Frank G. Font
Assistant Examiner—Reginald A. Ratliff
Attorney, Agent, or Firm—Frishauf, Holtz, Goodman, Langer & Chick

[57] ABSTRACT

An optical encoder comprising a movable scale moving relatively to a light source, a surface-emitting semiconductor laser light-source for radiating a part of the movable scale, and a photodetector for receiving reflection light by the movable scale or transmission light through the movable scale.

20 Claims, 9 Drawing Sheets

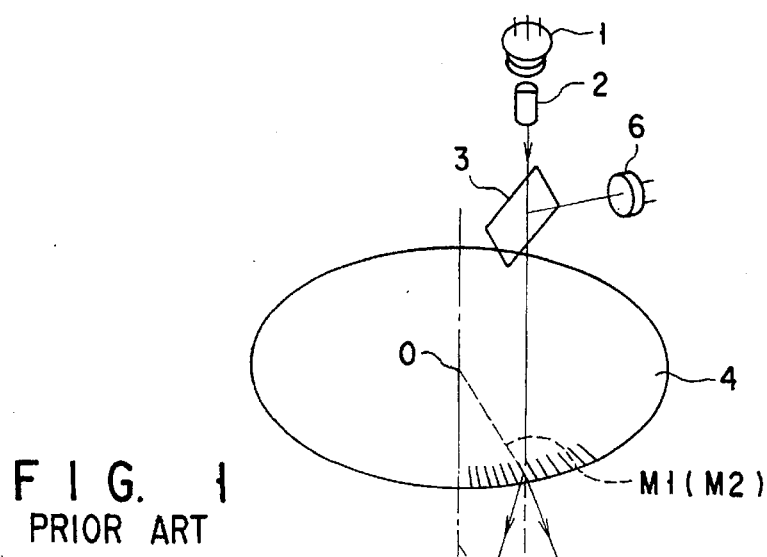
FIG. 1
PRIOR ART
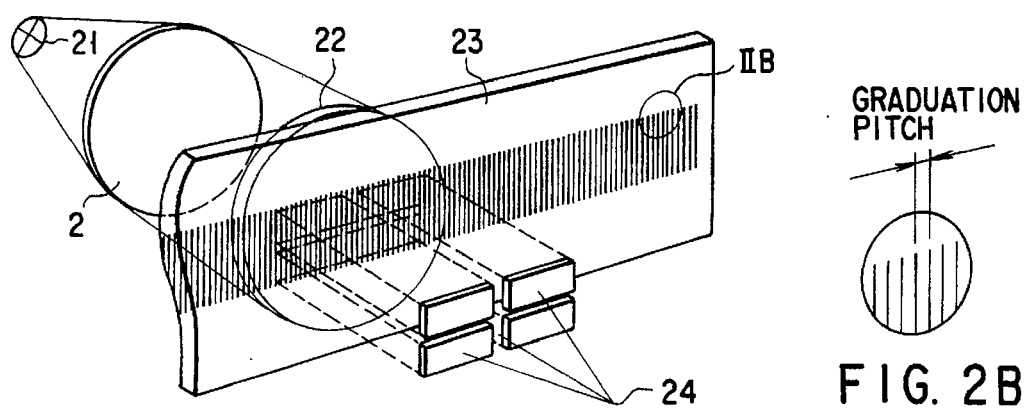
FIG. 2A
PRIOR ART
FIG. 2B
PRIOR ART
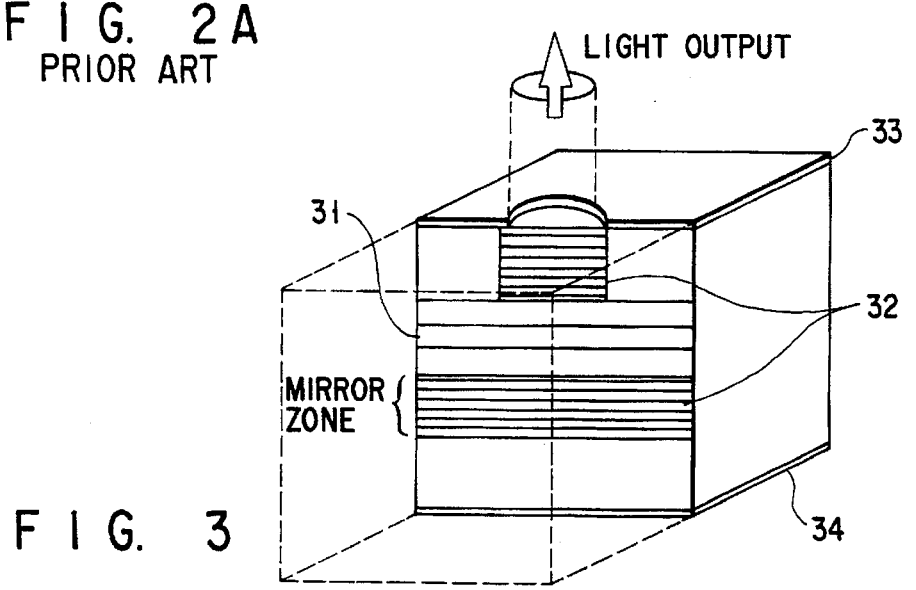
FIG. 3

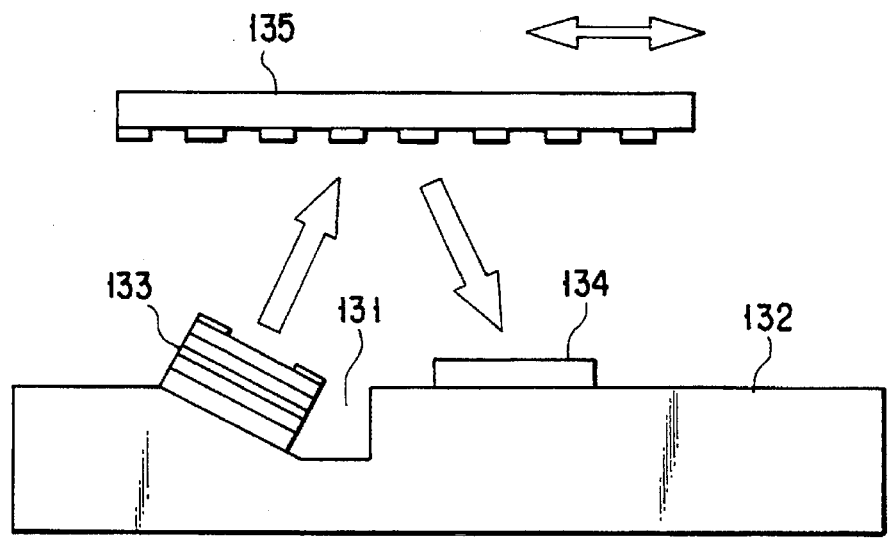
F I G. 13A
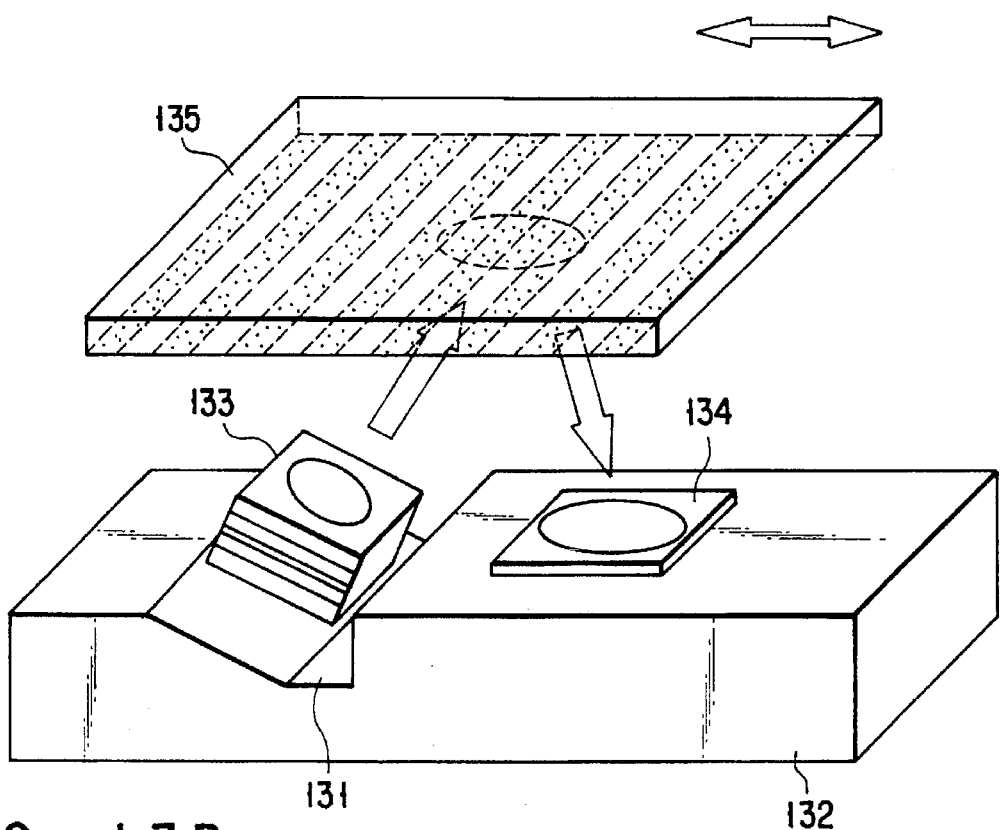
F I G. 13B

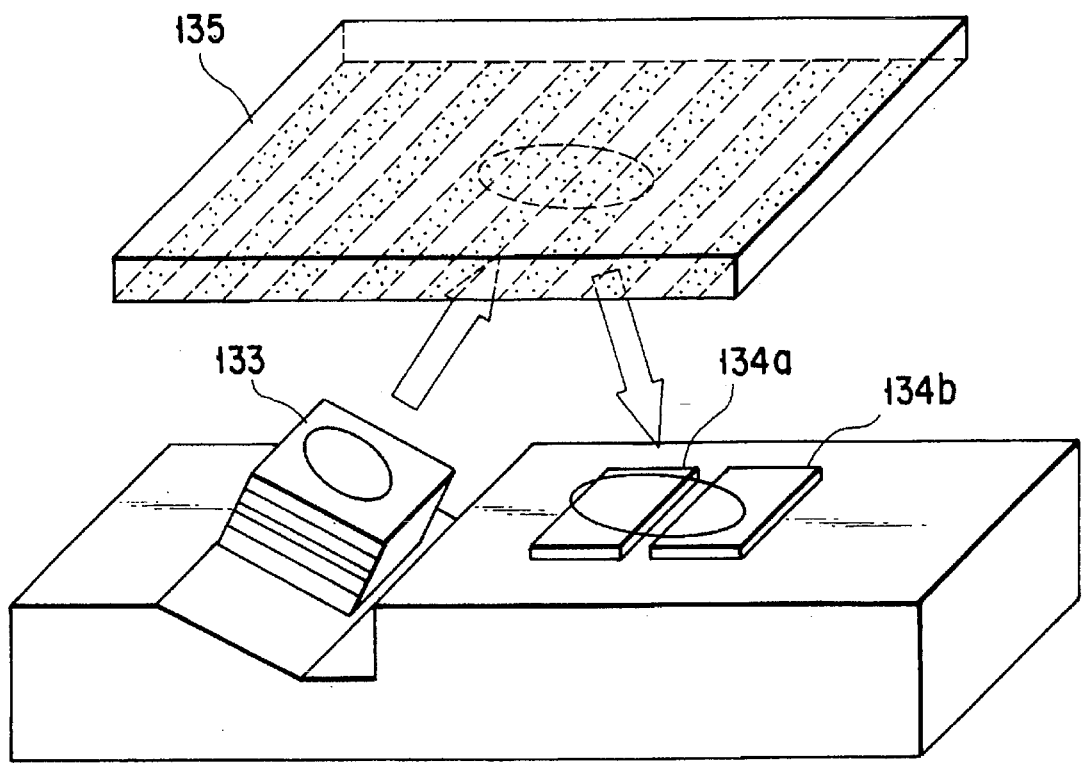
F I G. 16
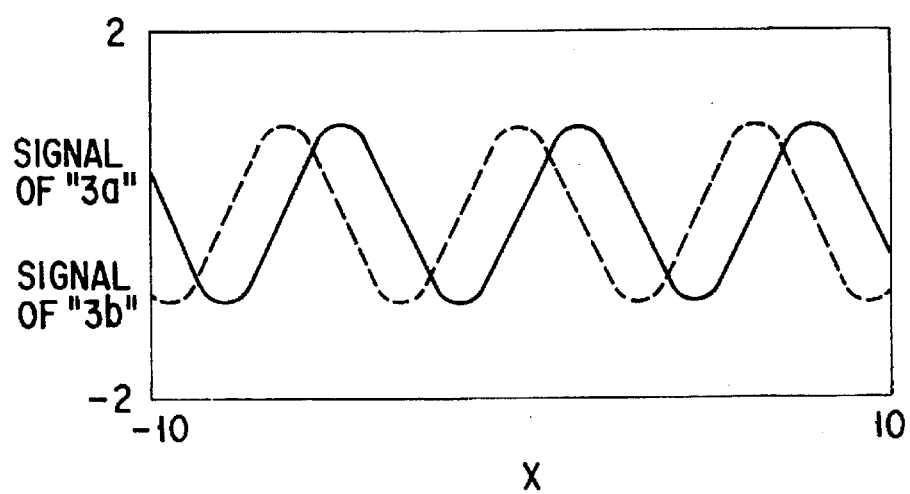
F I G. 17

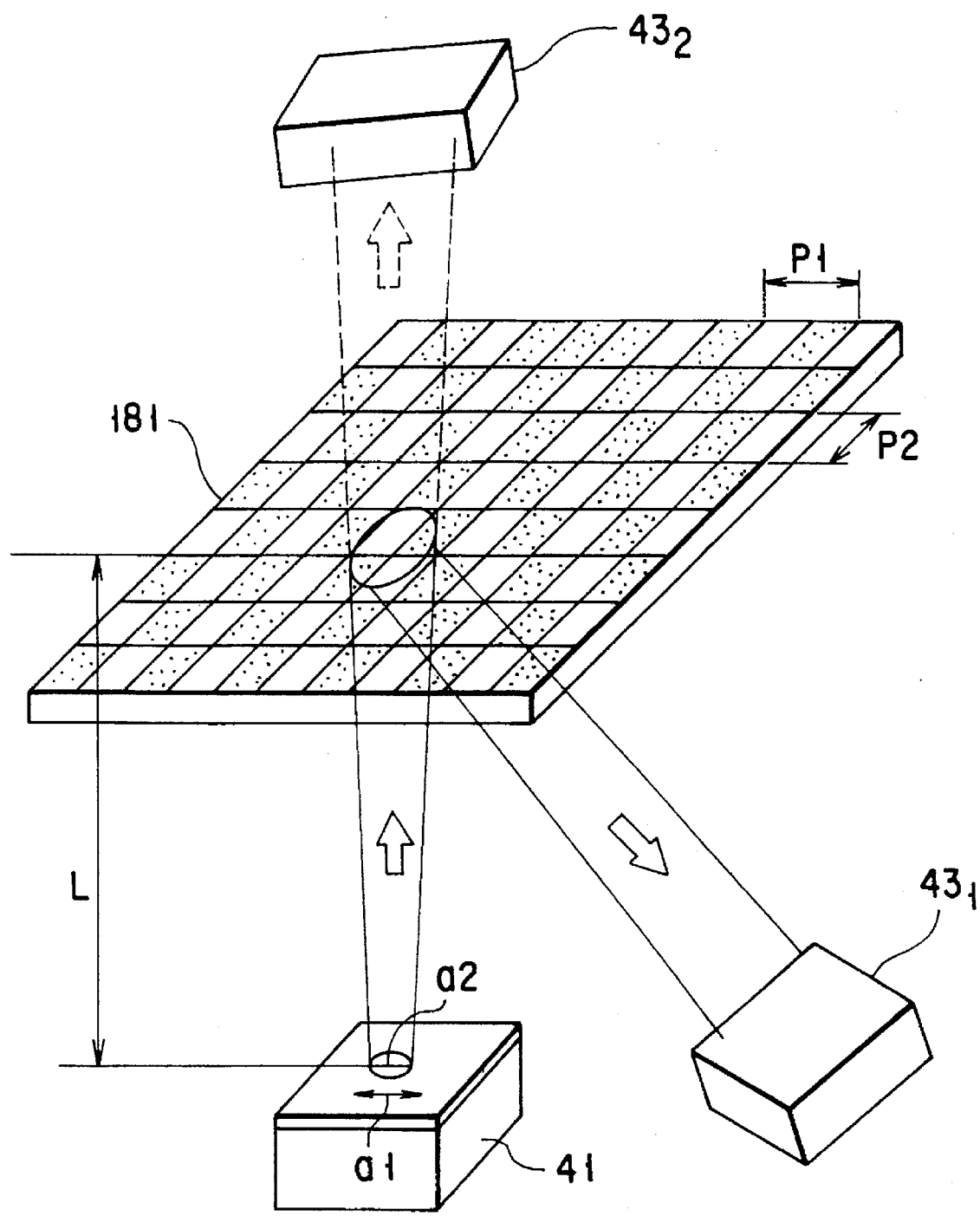
F I G. 18

OPTICAL ENCODER

BACKGROUND OF THE INVENTION

1. Field of the Invention

The present invention relates to an optical encoder for use in detecting an amount of movement (moving distance) when a movable part of a device moves.

2. Description of the Related Art

A conventional optical encoder comprises a light source, (e.g., a semiconductor laser), a photodetector (a light detecting element), diffraction grating, a collimator lens (or a condensor lens), and the like. Having many components, the encoder can be hardly miniaturized. Representative examples of conventional optical encoders are disclosed in, for example, Pat. Appln. KOKAI Publication No. 62-200224 and "Nikkei Mechanical" page 54, 1988.7.25, which are respectively shown in FIGS. 1, 2A and 2B.

(1) Pat. Appln. KOKAI Publication No. 62-200224

As illustrated in FIG. 1, light beams emitted from laser 1 are shaped into parallel light beams by collimator lens 2. The parallel light beams travel through beam splitter 3 and enter into diffraction grating 4 in motion. The light beams diffracted from diffraction grating 4 are reflected by mirrors 5 and 5' and returned to beam splitter 3, in which two reflected beams are combined together. The intensity of the light beams is detected by photodetector 6. The movement amount (moving distance) of diffraction grating 4 can be detected as an interference intensity variation at the photodetector 6. The encoder requires a number of members including the laser 1, collimator lens 2, beam splitter 3 and the like as shown in FIG. 1. Consequently, an encoder becomes large. Accordingly, the encoder is not suitable for use in a small device.

The optical encoder shown in FIG. 1 uses a diffraction grating as a scale. Another conventionally known encoder uses a scale consisting of a high-reflectivity portion and a low-reflectivity portion alternately arranged and detects only brightness and darkness apparent on the scale. In this encoder, the resolution thereof is low because a scale pitch (the distance between the graduations) cannot be made excessively smaller. However, since no interference mirrors (5 and 5') are required, the encoder can be miniaturized. When this encoder employs a conventional stripe-type semiconductor laser as a light source, the collimator lens is still required. Consequently, the collimator lens cannot be eliminated from the encoder in the prior art.

(2) "Nikkei Mechanical" page 54, 1988.7.25

As illustrated in FIG. 2A, light beams emitted from light source 21 are shaped into parallel light beams by collimator lens 2. The parallel beams travel through immobilized scale 22 and mobile scale 23, both having the same scale pitch, and reach light-receiving portion 24. As the scale 23 moves, an overleaped area of light-transmissible portions of the immobile and the mobile scales, changes, inducing a change in output signals from the encoder. Taking advantage of the output signals changing in accordance with the movement amount (moving distance) of the mobile scale, the displacement (moving distance) of the mobile scale can be measured in the light receiving portion.

As described above, a beam splitter, lenses and mirrors must be arranged as shown in FIG. 1 and a lens and two scales must be arranged as shown in FIGS. 2A and 2B, with a high degree of accuracy. Hence, it is very difficult to fabricate an encoder. Further, the encoder is inevitably large and its manufacturing cost is high.

As is apparent from the foregoing, a conventional encoder is hardly miniaturized since it uses a conventional semiconductor laser light as a light source.

SUMMARY OF THE INVENTION

The object of the present invention is to provide a miniaturization-feasible optical encoder.

According to one aspect of the present invention, there is provided an optical encoder comprising a movable scale moving relative to a light source, a surface-emitting semiconductor laser light-source for radiating a part of the movable scale, a photodetector for receiving reflection light by the movable scale or transmission light through the movable scale.

According to another aspect of the present invention, there is provided an optical encoder comprising a movable scale moving relative to a light source, a surface-emitting semiconductor laser light-source for radiating a part of the movable scale, and a photodetector for receiving reflection light by the movable scale or transmission light through the movable scale, in which the optical encoder satisfies the following relationship:

$$p \geq \lambda \cdot L/a, \text{ when } L \geq a^2/\lambda,$$

where L is the distance between the movable scale and a light-beam emitting surface of the surface-emitting semiconductor laser light-source, $\lambda$ is a wavelength of a light beam, p is a scale pitch, a is the opening length of the light source along the pitch direction of the scale. The "pitch direction" herein is a direction of juxtaposed graduation marks provided on the scale.

According to still another aspect of the present invention, there is provided an optical encoder comprising a movable scale travelling relative to a light source, a surface-emitting laser light-source for radiating part of the movable scale, and a photodetector for receiving reflection light by the movable scale or transmission light through the movable scale, in which the optical encoder satisfies the following relationship:

$$p \geq a, \text{ when } L < a^2/\lambda,$$

where L is the distance between the moving scale and a light beam emitting surface of the surface-emitting semiconductor laser light-source, $\lambda$ is a wavelength of a light beam, p is a scale pitch, a is the opening length of the light source along the pitch direction of a scale.

According to a further aspect of the present invention, there is provided an optical encoder comprising a movable scale moving relative to a light source, a surface-emitting semiconductor laser light-source for radiating a part of the movable scale, and a photodetector for receiving reflection light by the movable scale or transmission light through the movable scale, in which the optical encoder satisfies the following relationship:

$$p_1 \geq \lambda \cdot L/a_1, \text{ when } L \geq a_1^2/\lambda$$

$$p_2 \geq \lambda \cdot L/a_2, \text{ when } L \geq a_2^2/\lambda$$

$$p_1 \geq a_1, \text{ when } L < a_1^2/\lambda$$

$$p_2 \geq a_2, \text{ when } L < a_2^2/\lambda$$

where L is the distance between the movable scale and a light beam emitting surface of the surface-emitting semiconductor laser light-source, $\lambda$ is a wavelength of a light beam, $p_1$ and $p_2$ are pitches of the scales having different specific direction, and $a_1$ and $a_2$ are opening lengths of said light-source corresponding to the direction of pitches $p_1$ and $p_2$.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a view explaining a conventional optical encoder;

FIGS. 2A and 2B are views explaining another conventional optical encoder;

FIG. 3 is a view showing a model structure of a surface-emitting laser;

FIG. 12A shows a case where wavelength λ of light beam: 1 μm, opening length a: 5 μm;

FIG. 12B shows a case where wavelength λ of light beam: 1 μm, opening length a: 10 μm;

FIG. 12C shows a case where wavelength λ of light beam: 1 μm, opening length a: 15 μm;

Figure 14A:
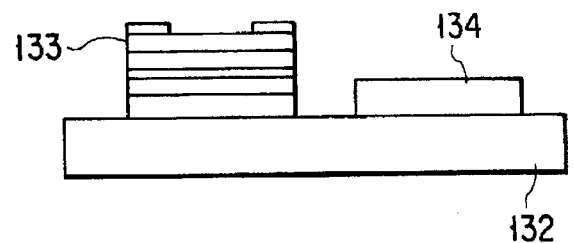
Figure 14B:
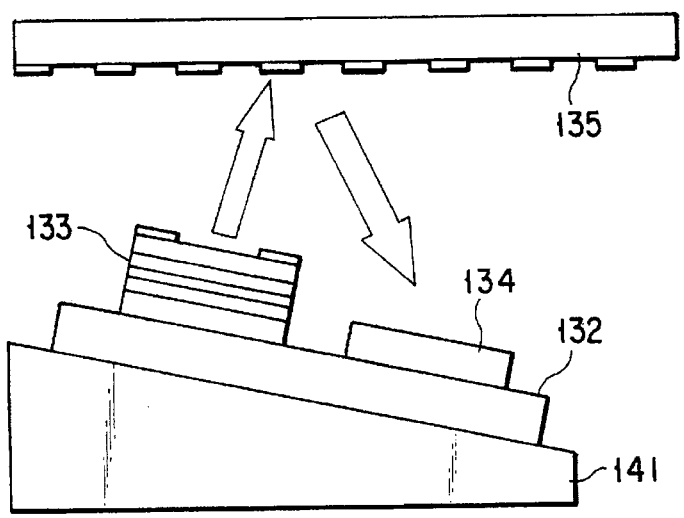
Figure 15:
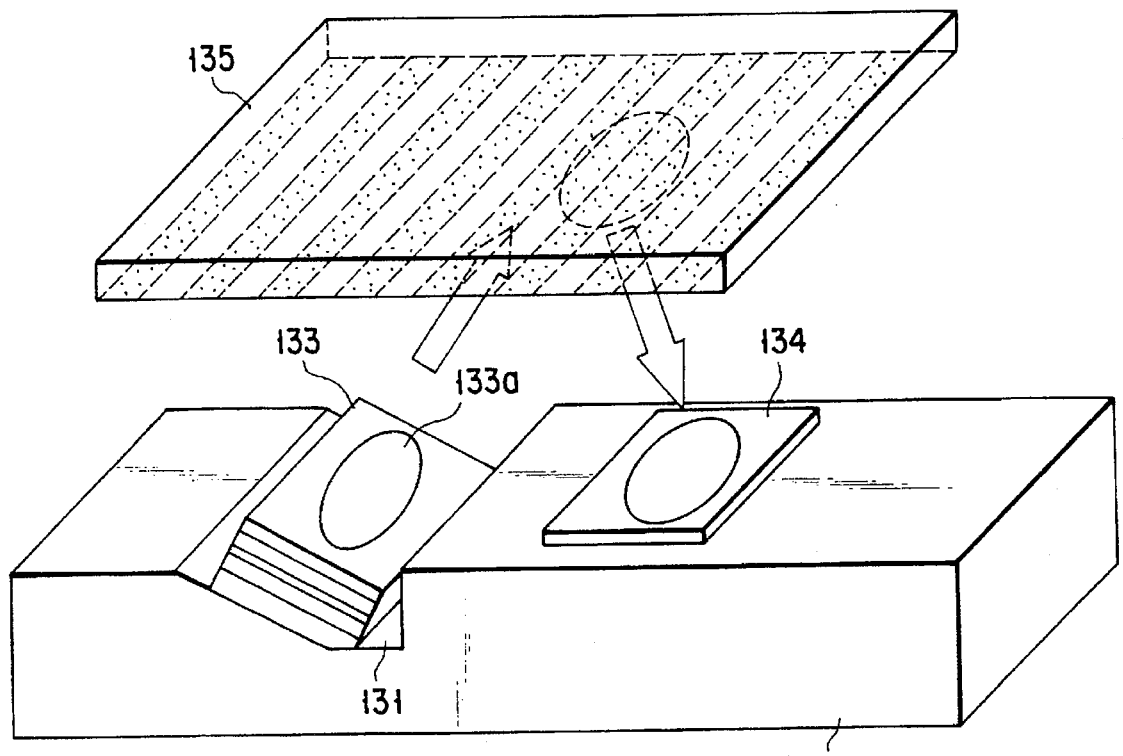
Figure 4:
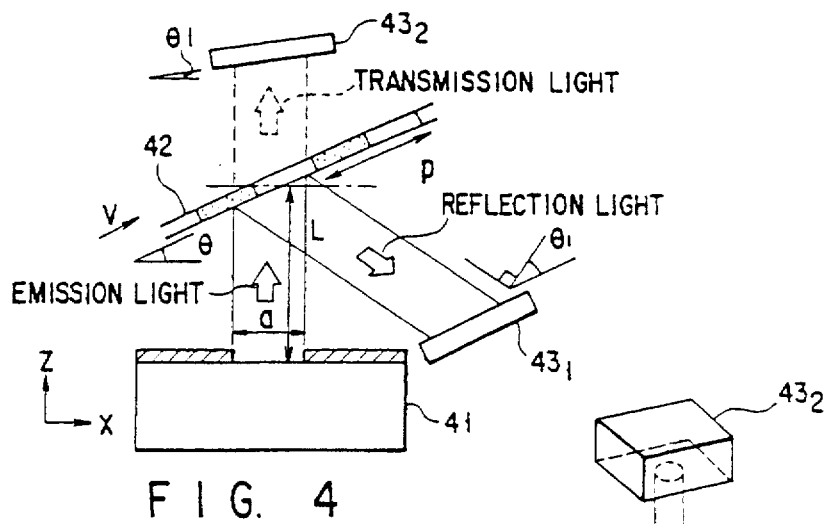
Figure 5:
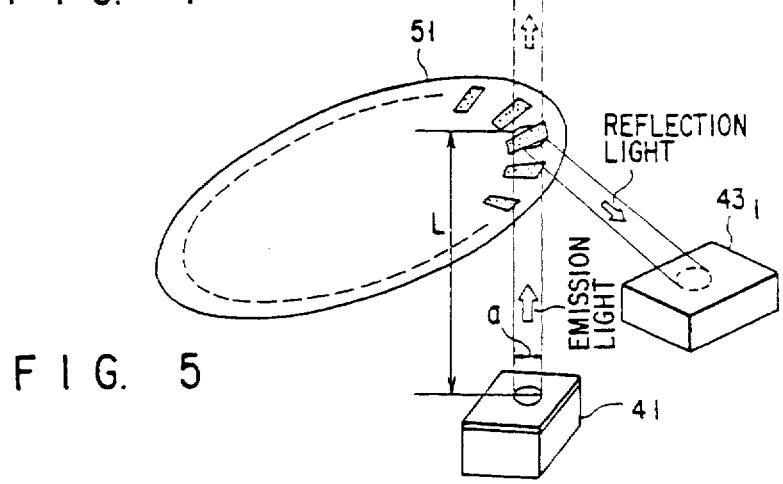
Figure 6:
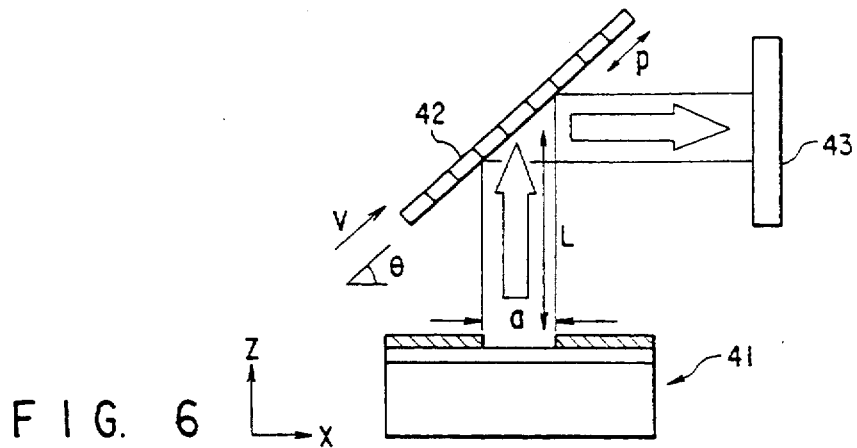

FIGS. 13A and 13B respectively show a side view and a perspective view of the optical encoder according to Example 1 of the present invention;

FIGS. 14A and 14B respectively show a side view and a perspective view of the optical encoder according to Example 2 of the present invention;

FIG. 15 is a perspective view of the optical encoder according to Example 3 of the present invention;

FIG. 16 is a perspective view of the optical encoder according to Example 4 of the present invention;

FIG. 17 is a graph showing output signals of a photodetector; and

FIG. 18 is a view explaining the optical encoder according to Example 5 of the present invention.

DETAILED DESCRIPTION OF THE PREFERRED EMBODIMENTS

In the present invention, the light emitted from a thin-film surface of a semiconductor light-source is reflected by (or transmitted through) a scale. The reflection (or transmission) light is received by photodetector (conditions restricting the shape of the opening of the light source will be described later).

Since an encoder employs a surface-emitting laser as a light source, the size and shape of a beam emission window can be appropriately designed within the range of several μm to several-hundred μm. To be more specific, a fine and sharp beam can be emitted from the beam emission window of several μ to several-hundred μm by controlling the angle of the beam expansion. As a result, a collimator lens as shown in FIG. 1 or FIGS. 2A and 2B can be eliminated. By use of the fine and sharp beam of the surface-emitting laser, the beam can be restricted spacially on the scale surface, so that an encoder can work even if the fixed scale shown in FIGS. 2A and 2B is not provided. In this construction, techniques for arranging and holding the immobilized scale and the movable scale accurately are not necessary. Further, the light intensity of the beam reflected by the scale or the beam transmitted through the scale can be measured making use of the fine and sharp beam emitted from the surface-emitting laser. Thus, a high resolution encoder is realized.

In short, an extremely small and thin high-resolution encoder can be realized with a simple structure. In addition, the encoder can be produced at extremely low cost since an optical adjustment step from a light source to a light receiving element is simplified owning to fewer requisite members.

Hereinbelow, Examples of the present invention will be explained together with Comparative Examples.

Prior to explaining the Examples, we will describe principles of the present invention common in each Example. First, we will refer to FIG. 3 showing a structure of a surface-emitting laser used as a light source. As shown in the figure, multi-layered mirrors 32 are formed so as to sandwich active layer (a light emission layer) 31 therebetween. These mirrors are further interposed between the upper electrode 33 and the lower electrode 34. When electric voltage is applied between the upper electrode 33 and the lower electrode 34, electric current comes into active layer 31, generating light therefrom. Due to pair of mirrors 32, oscillation occurs in the film-thickness direction and light is generated in the direction perpendicular to the film surface as shown in FIG. 3. For emitting light, the upper electrode corresponding to the light emitting portion thereof is partially removed. For example, GaAs may be used as a material for active layer 31 and a p-type or an n-type GaAs/AlGaAs stacked films may be used as a material for mirrors 32.

The laser thus-constructed has an advantage in that the shape of the opening (light-emitting portion) can be freely designed by patterning the upper electrode. The expansion of the emitting light is regulated by the shape and the size of the opening. Since the beam expansion is caused by diffraction from the opening, it can be controlled and suppressed low by designing the opening appropriately. Hence, if the appropriately-designed surface-emitting type laser is employed as a light source, a collimator lens (a condenser lens) usually used in a conventional encoder will be no longer necessary. Consequently, the encoder is miniaturized.

Hereinafter, an encoder having the above-mentioned structural constitution will be explained on the basis of detailed calculation examples.

Figure 4:
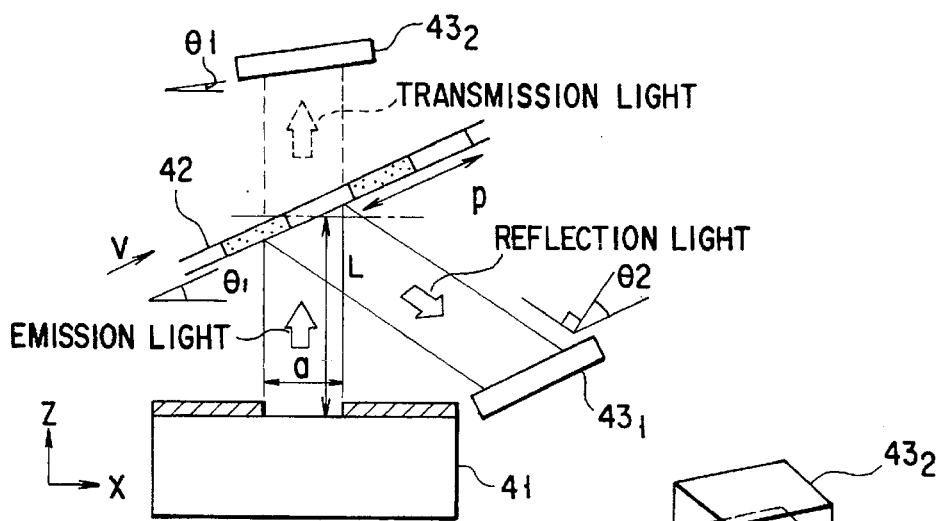
FIG. 4 is a view explaining an optical encoder using a linear scale.

The structural model of an encoder constructed using a surface-emitting laser without a collimator lens is shown in FIG. 4. The light beam emitted from surface-emitting laser 41 is reflected by linear scale 42 or transmitted through the linear scale 42. The resultant light (reflected or transmitted light) is received by a photodetector $43_1$ (or $43_2$). "Scale" used herein is defined as a member on which a high-reflectivity (transmissivity) portion and a low-reflectivity (transmissivity) portion are alternately arranged. This scale can be easily formed by steps of depositing a metal such as Al on a glass substrate to form a thin film having a high reflectivity, and patterning the resultant film by lithography.

The encoder thus-arranged works as long as either photodetector $43_1$ detecting the reflected light by the scale or photodetector $43_2$ detecting transmission light is present. In Examples below, the encoder using the reflection light is explained, however the present invention will not be limited by such Examples. An encoder using transmission light can be realized with the similar structural constitution described above.

Figure 5:
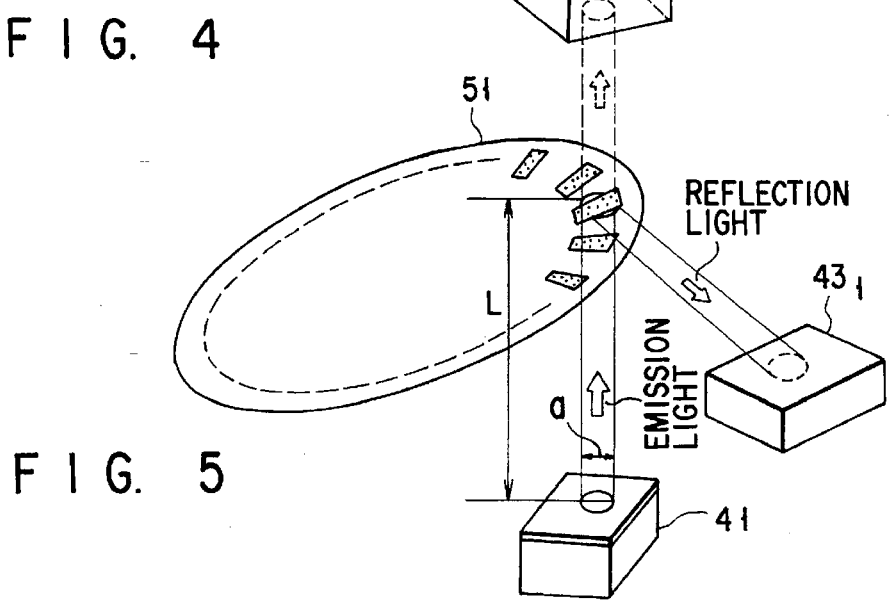
FIG. 5 is a view explaining an optical encoder using a rotary scale.

In FIG. 4, a linear scale is used as a scale, whereas a rotary scale rotating relatively to a light source may be used as shown in FIG. 5. When the rotary scale is used, the rotation of an object can be measured. In the following Examples, an encoder using the linear scale will be explained, however the present invention will not be limited by this. The rotary scale can be applicable to an encoder having the similar structural constitution.

In FIGS. 4 and 5, light-detecting surfaces of photodetectors $43_1$ and $43_2$ are tiled respectively at angles $\Theta_2$ and $\Theta_2$ relative to the surface perpendicular to the light-entering direction. This arrangement is made for suppressing the change in output sensor-signals, caused by an optical feedback, that is, the reflection light returning from the detecting surface of the photodetector to the surface-emitting laser. When the returning light from the scale and from the detecting surface has little influence upon the sensor-signal output, for example, in the case where a reflection-free film or a low-reflectivity film is applied both on the detecting surface and the scale surface, it is not necessary to set $\Theta_1 \neq 0$, $\Theta_2 \neq 0$.

On the other hand, the light intensity distribution of laser beam on the linear scale is controlled by the shape and the size of the opening of the surface-emitting laser as previously described and by the distance between the light source and the scale. Assuming that the opening length of the laser measured along the pitch direction of the linear scale 42 is defined as a, the distance between the laser and the scale 42 is L, and a wavelength of a laser is $\lambda$, laser beam diameter W (full width at half maximum) on a scale is given by the following Equation (1):

$$W \equiv L\lambda/a \qquad (1)$$

when L is excessively larger than a, desirably $L \geq a^2/\lambda$, or given by the following Equation (2):

$$W \equiv a \qquad (2)$$

when $L < a^2/\lambda$.

To detect the intensity of reflection (or transmission) light beam by the scale with proper signal amplitude level, it is desirable that scale pitch p be larger than beam diameter W. "Signal amplitude" used herein is defined as the difference between a maximum value and a minimum value of an output signal wave obtained by a photodetector.

Accordingly, to obtain output signals with large signal amplitude, it is desirable that p satisfy the following Equation (3):

$$P \geq \lambda \cdot L/a \qquad (3)$$

when $L \geq a^2/\lambda$, or $$p \geq a \qquad (4)$$

when $L < a^2/\lambda$.

Figure 7:
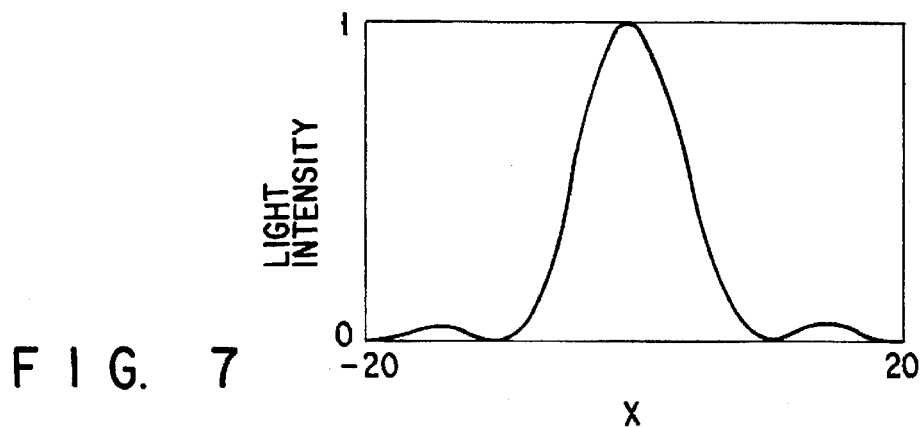
FIG. 7 is a graph showing light-intensity distribution on a linear scale.

The above Equations give considerably rough calculation values. In FIG. 7, we will present a more accurate calculation example of light intensity distribution on the scale surface using diffraction integration. The distribution of light intensity $|A|^2$ at distance L, of a plane wave emitted from an emission window of the light source having opening length a, is expressed by the following Equation (5). When L is large; $L \geq a^2/\lambda$, the light intensity distribution can be obtained by spatially applying Fourier transformation to a pupil function corresponding to an emission window:

$$|A|^2 = C \left[ \frac{\sin(\pi a/\lambda L) \cdot x}{(\pi a/\lambda L) \cdot x} \right]^2$$

where a center of an emitting beam is defined as an origin x, the X-axis is assumed to be parallel to the emitting surface, and C is a constant independent of x.

FIG. 7 shows the light intensity profile calculated on the assumption of a wavelength $\lambda=1$ µm, opening length a=10 µm, distance L between a scale and an opening=100 µm. The axis of ordinates is normalized assuming that C=1. Light spot diameter is approximately 10 µm in terms of full width at half maximum. In this calculation, $\theta$ is neglected assuming that $\theta$ (an angle between a linear scale and the opening) is sufficiently small to ignore.

Figure 6:
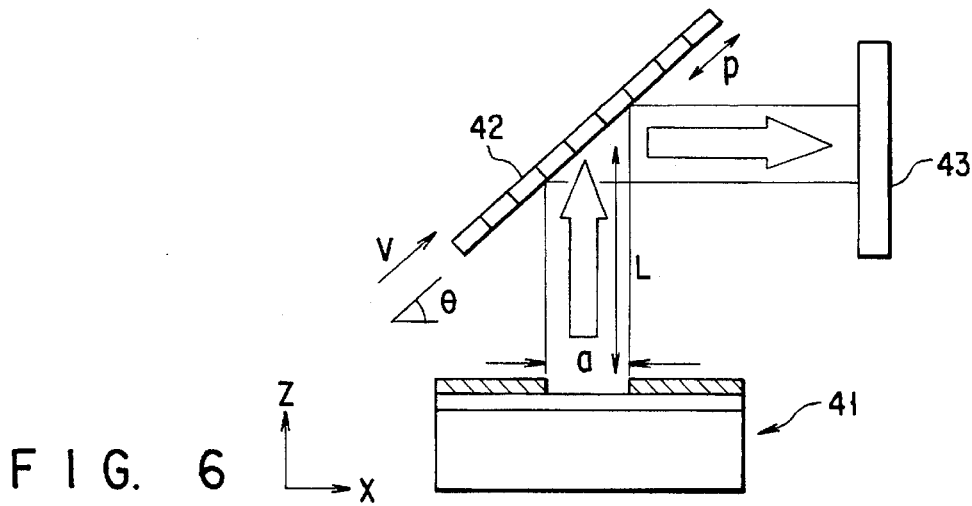
FIG. 6 is a schematic diagram showing a structure model of the optical encoder of the present invention.
Figure 8A:
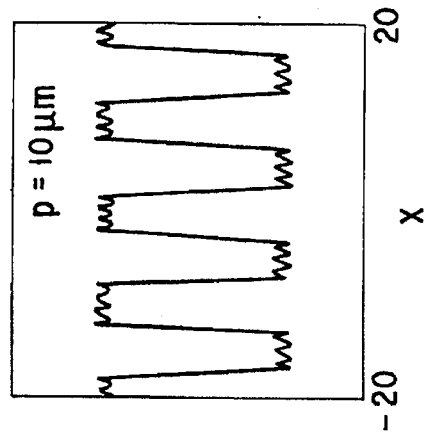
FIGS. 8A, 8B and 8C are characteristic graphs showing a scale reflectivity in the case where scale pitch p is 20 μm, 15 μm and 10 μm, respectively.
Figure 8B:
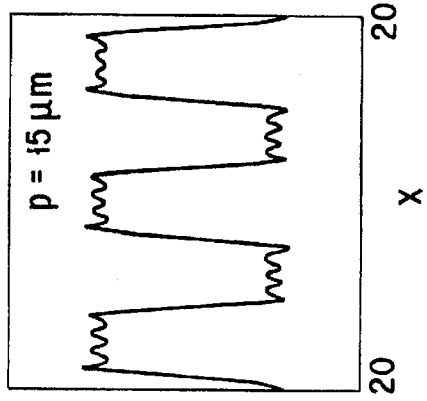
Figure 8C:
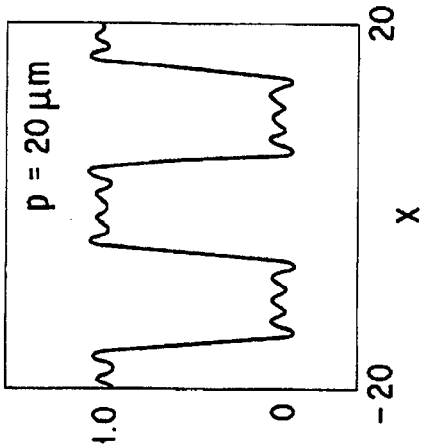
Figure 9A:
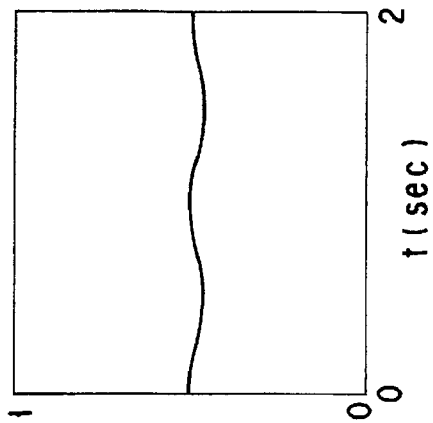
FIGS. 9A, 9B and 9C are characteristic graphs showing the light intensity received in the case where scale pitch p is 20 μm, 15 μm and 10 μm, respectively.
Figure 9B:
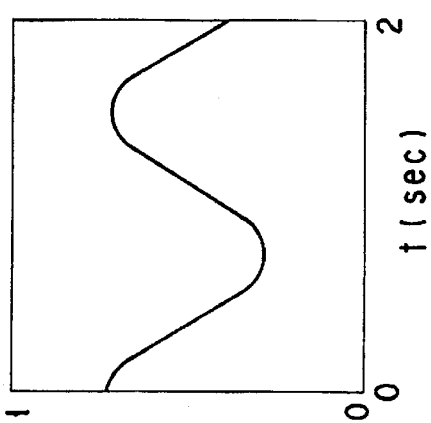
Figure 9C:
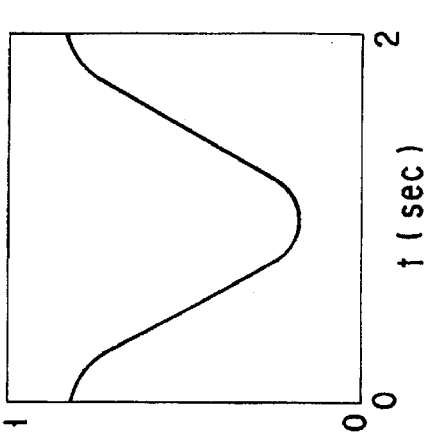

When the laser beam is radiated onto the linear scale, the amount of reflection light can be obtained by integrating the product of linear-scale reflectivity-distribution and light-intensity distribution on the X-axis. A photodetector herein is assumed to be sufficiently large enough to receive all amount of reflection-light. The reflectivity distribution of the linear scale is approximately expressed in terms of Fourier series on calculation. When the linear scale moves at a velocity of 10 µm/s in the direction of an arrow shown in FIG. 6, the light intensity received by the photodetector is shown in FIGS. 8A–8C and 9A–9C. More specifically, FIGS. 8A–8C shows distribution of scale reflectivity and FIGS. 9A–9C shows light intensity received by the photodetector.

These graphs show the calculation for the case of scale pitch p=20, 15 and 10 µm. As a result, periodical signals specific to the pitch are obtained. The Displacement of a scale can be determined on the basis of the relationship between signal waves and the displacement of signals. We can measure the scale displacement, for example, by counting the signal cycles or converting the signals to displacement signals electrically.

As the pitch of the scale becomes smaller, the signal amplitude becomes smaller. The signal amplitude herein is normalized assuming that the difference in output signals between the case where a light is reflected 100% and the case where no light is reflected, is defined as 1. Beam diameter W on the scale is approximately 10 µm under the conditions of FIGS. 8A–8C and 9A–9C, according to the calculation based on Equations (1) and (2). From the results shown in FIGS. 8A–8C and 9A–9C, it is found that when the scale pitch is approximately larger or equal to the beam diameter W on the scale, that is, $p \geq W$, signal amplitude of about 0.1 or more can be obtained. This is considered to be a principle finding in order to regulate the amplitude of the output signal from an encoder so as to have at least a certain level.

Figure 10:
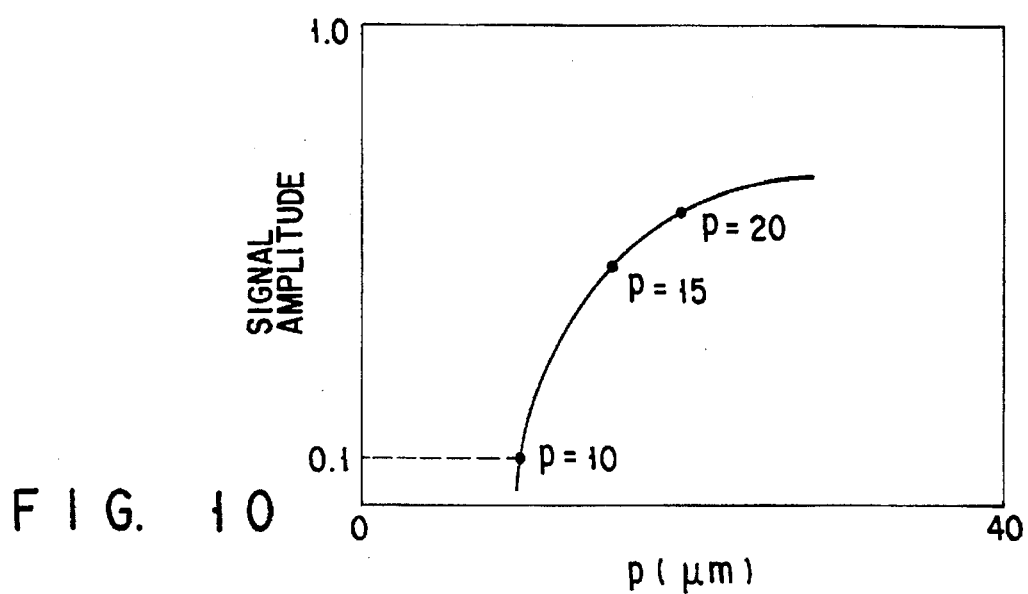
FIG. 10 is a graph showing the relationship between scale pitch p and the signal amplitude.

FIG. 10 shows a graph showing variation in signal amplitude against scale pitch p. In the graph, ● are plots indicating the same p values as shown in FIGS. 8A–8C. The value p=10 μm coincides μm with the minimum condition of equation (2), that is, p=Lλ/a. As is apparent from the graph, signal amplitude at p=10 μm is 1/10 of the overall light amount. Hereinafter signal amplitude 0.1 is regarded as the lowermost signal amplitude of a practical use. However, as long as S/N (signal-to-noise ratio) of a photodetector is high, the photodetector can be used even though a signal amplitude indicates 0.01. From this result, it is demonstrated that the condition given by the previously performed rough calculation according to Equation (2) is quite proper.

In case of L<$a^2/\lambda$, beam diameter W is almost equivalent to a. Taking this fact into consideration in designing an encoder, conditions for providing output signals having satisfactory S/N will be given by Equations (3) and (4).

Figure 11:
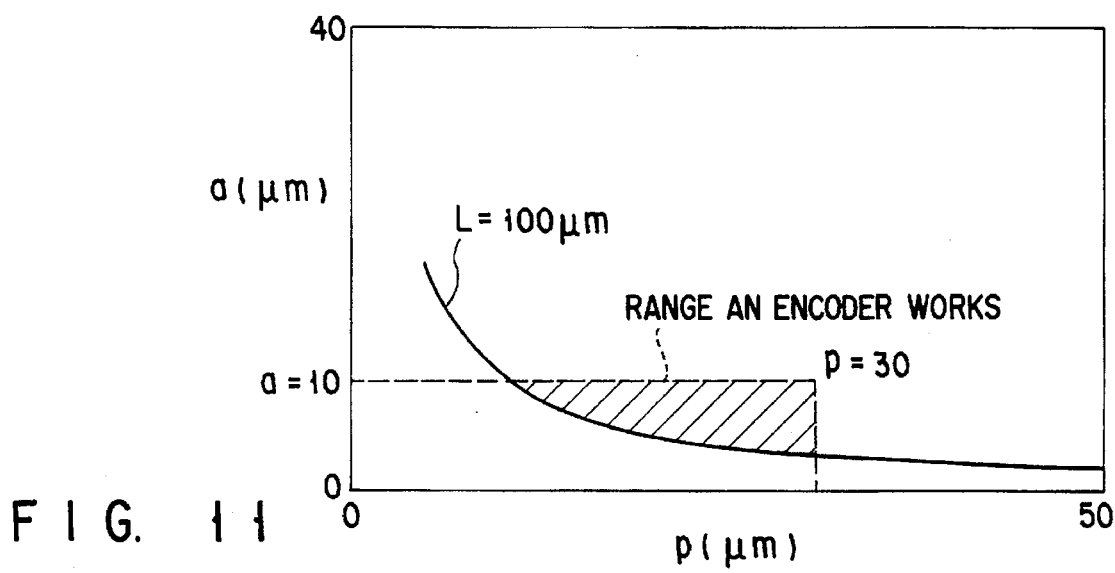
FIG. 11 is a graph showing a range in which an optical encoder is functional.

FIG. 11 shows the range of the opening length a to obtain a signal amplitude of at least 0.1 assuming that a scale pitch p≦30 μm, λ=1 μm, and L=100 μm.

Figure 12A:
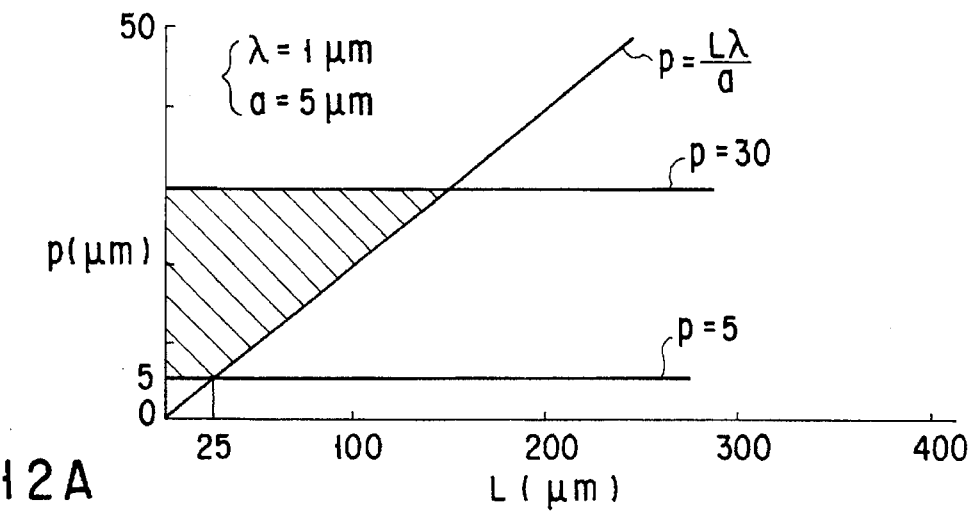
FIGS. 12A, 12B and 12C are characteristic graphs showing the tolerable range for the scale pitch and distance L between the movable scale and a light-beam emitting surface of a surface-emitting semiconductor laser.
Figure 12B:
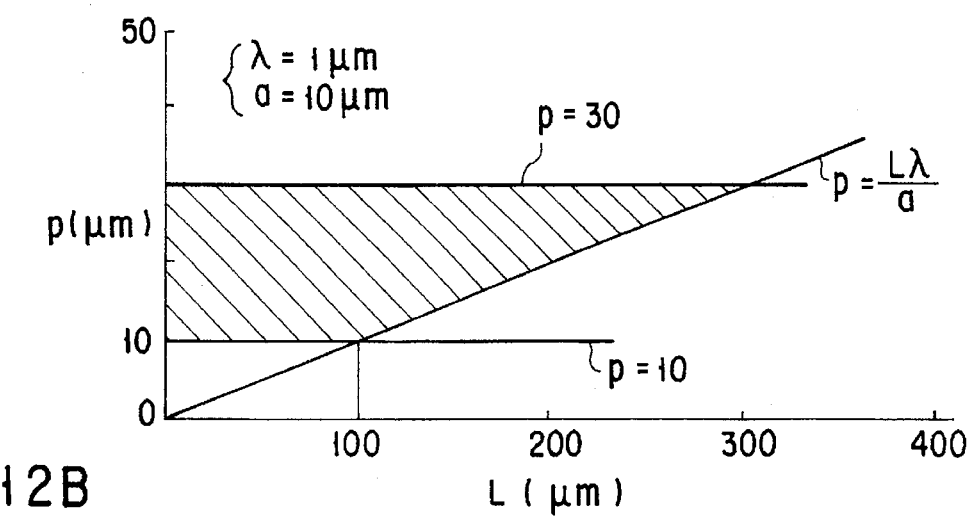
Figure 12C:
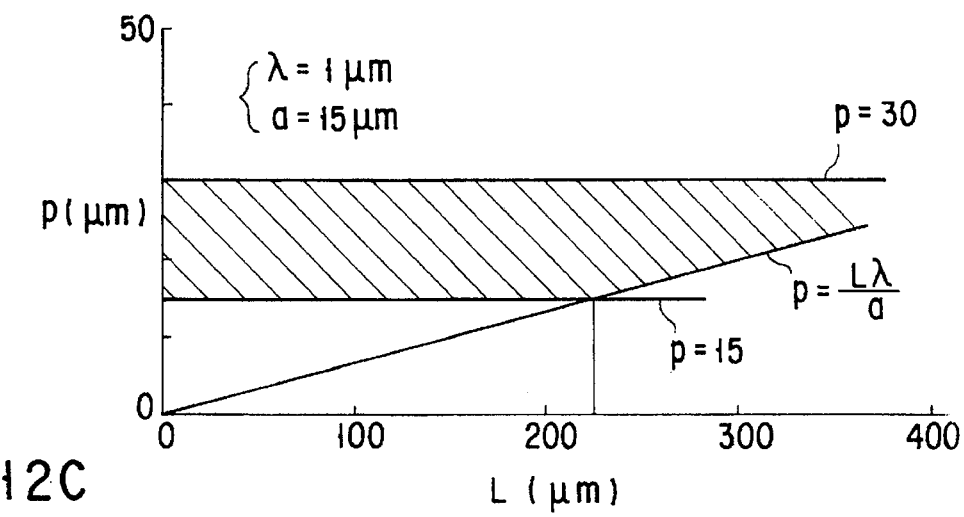

Hatched areas of FIGS. 12A, 12B and 12C are a desirable range of p and L, that is, a range indicating a signal amplitude of at least 0.1 with respect to a=5 μm, 10 μm, and 15 μm. The conditions used herein are that λ=1 μm, a scale pitch p is 30 μm or less.

If a surface emitting semiconductor laser light source is used, the diameter a of the emission window can be set in a wide range. Therefore, an encoder having a desired resolution can be achieved by setting parameters L, λ, p, and a appropriately as described above. In particular, an encoder having a small scale pitch can be attained without a lens. Consequently, it is possible to fabricate a miniaturized optical encoder having high resolution with a simplified manufacturing process.

EXAMPLE 1

We will refer to FIGS. 13A and 13B, herein. FIGS. 13A and 13B are a side view and a perspective view of an optical encoder, respectively.

As shown in FIGS. 13A–13B, surface-emitting laser (light emission element) 133 and photodetector 134 are fixed onto dielectric substrate 132 on which concave portion 131 is partially provided. Particularly, the surface emitting laser 133 is placed on a tilted surface of the concave portion 131. Reference numeral 135 in the figures indicates a linear scale. The scale moving direction and the scale pitch direction shown in FIG. 13A is parallel to the paper surface. However, they may be perpendicular to the paper surface. The above-mentioned flexibility of the moving scale direction and the pitch direction is applied to other Examples of the present invention.

Hereinbelow, we will explain the function of an optical encoder according to Example 1. Light emitted from the surface-emitting laser 133 is reflected by linear scale 135. Zero-order diffraction light, namely, reflection light is received by photodetector 134. As previously described, beam spot expansion can be suppressed to some extent by regulating a size of the opening of the surface-emitting laser. Hence, a high-resolution encoder is formed without a conventionally-used collimator lens for use in beam shaping.

The optical encoder according to Example 1 has the following advantageous effects.

In Example 1, it is possible to achieve a small and thin encoder at low cost because a number of members are decreased. Since a substrate and a scale can be arranged in parallel, an encoder can be miniaturized in its entirety. Furthermore, since zero-order diffraction light is received, it is possible to detect highly permissible signals, that is a signal less dependent on scale-pitch accuracy, reflection accuracy unlike the case where higher-order diffraction light is received. In Example 1, a photodetector and a light emitting element are positioned on a dielectric substrate; however, a substrate is not limited to a dielectric body. A semiconductor may be used as a substrate.

If the semiconductor substrate is used, a photodetector or a light emitting element can be formed as one united body on the substrate, so that a step of conjugating such elements onto the substrate is not required. As a result, the entire manufacturing process can be simplified. If a signal processing circuit is formed within the semiconductor substrate, further miniaturization of the encoder including the circuit will be achieved.

In Example 1, although a light emitting element is positioned on the tilted surface of a concave portion provided on the substrate, a flat substrate without the concave may be used.

EXAMPLE 2

We will explain an encoder according to Example 2 with reference to FIGS. 14A and 14B.

The encoder of Example 2 has the similar structural constitution as that of Example 1, except that dielectric flat substrate 132 having no concave portion is used. Light emitting element 133 and photodetector 134 are formed on the dielectric flat substrate. The substrate is mounted on tilted pedestal 141 as shown in FIG. 14B, and positioned diagonally relative to linear scale 135. Light emitted from the light emitting element 133 is reflected by the linear scale 135 and received by photodetector 134. Since the encoder of Example 2 employs a flat substrate unlike Example 1, it has an advantage in that a step of forming a concave portion on a substrate can be eliminated.

As the same as in Example 1, a semiconductor may be used as a substrate in this case. In particular, in the case where a compound semiconductor is used as a substrate, a photodetector and a light emitting element may be formed on the substrate surface in a one body by means of crystal-growing according to the vapor phase epitaxial method.

The structures of Examples 1 and 2 may be modified and changed in a various ways. An example of possible modification in common with Examples 1 and 2 is shown in FIG. 15 as Example 3.

EXAMPLE 3

FIG. 15 shows an example of an optical encoder having surface-emitting laser light-source 133 with ellipse opening 133a. In the case where the circular opening is not sufficient to provide satisfactory signals having satisfactory S/N, the ellipse opening is employed to improve S/N since the ellipse opening is effective to increase light amount of signals without lowering resolution. Although the encoder of Example 3 employs an ellipse opening, the similar effect can be obtained when a rectangular opening is employed. FIG. 15 shows a modified optical encoder of Example 1. The optical encoder of Example 2 can be modified in the similar way.

In the aforementioned Examples, only the moving distance of a scale can be detected but the moving direction thereof cannot be determined. The moving direction of a scale can be determined if some minor modifications are applied to the optical encoder. A modified encoder in such a way will be shown in FIG. 16 as Example 4.

EXAMPLE 4

The structural model of Example 4 is shown in FIG. 16. The optical encoder of Example 4 has the same structural constitution as that of Example 1 except that the photodetector 134 is divided into 134a and 134b. By dividing the photodetector 134 with a predetermined slit space, a phase of light signal entering into the photodetector can be shifted by $\pi/2$ as shown in FIG. 17. Relative to the phase of a light signal entering into the photodetector 134a, the light signal entering into the photodetector 134b advances by $\pi/2$ when a scale moves to the right-hand side in the figure. Conversely, the phase of the light signal entering into 134b is behind by $\pi/2$ when the scale moves to the left-hand side. The moving direction of the scale can be determined by the detection of phase-shift relation between two light signals. The phase difference in the above-mentioned two signals is not necessary to be set to $\pi/2$. It is possible to know the moving direction unless the phase difference is indicated by a value satisfying $n\pi$ (n: 0, ±1, ±2 . . .).

The moving direction of scale is not always determined in one dimension. The determination can be carried out in two dimensions by dividing the light receiving element into four. The substrate material and the spot shape employed in Example 4 can be modified in the same manner as in Examples 1–3.

In the aforementioned Examples, the moving distance of the scale can be determined in only one dimension. However, the moving distance can be two-dimensionally detected if some minor modifications are added to the structure. The modification will be described more specifically in Example 5 with reference to FIG. 18.

EXAMPLE 5

Scale 181 consists of two-dimensional patterns each having different reflectivity or transmissivity. The beam emitted from the surface-emitting semiconductor laser light source is radiated onto scale 181. The reflection light or transmission light is received by photodetector $43_1$ and $43_2$. Assuming that L is the distance between a movable scale and a beam emitting surface of the surface-emitting semiconductor laser light-source, $\lambda$ is a wavelength of the light beam, $p_1$ and $P_2$ are pitches of the scales having different specific direction, and $a_1$ and $a_2$ are opening lengths corresponding to the direction of pitches $p_1$ and $p_2$ shown in FIG. 18, respectively, an optical encoder is designed so as to satisfy the following relationships:

$p_1 \geq \lambda \cdot L/a_1$ when $L \geq a_1^2/\lambda$ $p_2 \geq \lambda \cdot L/a_2$ when $L \geq a_2^2/\lambda$ $p_1 \geq a_1$ when $L < a_1^2/\lambda$ $p_2 \geq a_2$ when $L < a_2^2/\lambda$ In the optical encoder satisfying the relationship above, the amplitude of the output signal can be set to a proper level. Since a diameter and a shape of an emission window thereof can be designed in a wide range by using the surface-emitting semiconductor laser light-source, an encoder having desired resolutions of different directions can be realized. This encoder works even if it does not have a lens. Further, an encoder having a scale of the specific direction with a small scale pitch can be realized without a lens. As a result, it is possible to miniaturize a high resolution optical encoder and simplify the manufacturing process thereof at low cost.

Hereinafter, the structures, functions and effects of the optical encoder of the present invention will be summarized.

1. Structural Constitution

An optical encoder comprising a movable scale moving relative to a light source, a surface-emitting laser light-source for radiating a part of the movable scale, and a photodetector for receiving reflection light by the movable scale or transmission light through the movable scale.

Function

In this present invention, light emitted from a surface-emitting semiconductor laser light-source is radiated onto a scale and reflected by the scale or transmitted through the scale and then received by a photodetector. As a result, the moving distance of the scale can be measured.

Effect

Since an emission window diameter of the laser can be designed in a wide range using a surface-emitting semiconductor laser light source, it is possible to realize an encoder having a desired resolution even if it does not have a lens or an immobilized slit. In particular, an encoder having a small scale pitch can be realized without a lens. Consequently, a high resolution optical encoder can be miniaturized and manufactured through simple steps at low cost.

2. Structural Constitution

An optical encoder comprising a movable scale moving relative to a light source, a surface-emitting semiconductor laser light-source for radiating part of the movable scale, and a photodetector for receiving reflection light by the mobile scale or transmission light through the movable scale.

in which the optical encoder satisfies the following relationship:

$p \geq \lambda \cdot L/a$, when $L = a^2/\lambda$, where L is the distance between the movable scale and a light beam emitting surface of the surface-emitting semiconductor laser light-source, $\lambda$ is a wavelength of the light beam, p is a scale pitch, a is an opening length of a beam diameter at the radiation window of a surface-emitting laser measured along the longitudinal direction of the scale.

Function

In this present invention, light emitted from a surface-emitting semiconductor laser light-source is radiated onto a scale, and reflected by the scale or transmitted through the scale and then received by a photodetector. As a result, the moving distance of the scale can be measured.

Effect

Because an emission window diameter of the laser can be designed in a wide range using a surface-emitting semiconductor laser light-source, it is possible to realize an encoder in such a way that it has a desired resolution having a construction with $L \geq a^2/\lambda$, even if it does not have a lens or an immobilized slit. In particular, an encoder having a small scale pitch can be realized without a lens. Consequently a high resolution optical encoder can be miniaturized and manufactured through simple steps at low cost.

3. Structural Constitution

An optical encoder comprising a movable scale moving relative to a light source, a surface emitting semiconductor laser light-source for radiating part of the movable scale, and a photodetector for receiving reflection light by the scale or transmission light through the movable scale, in which the optical encoder satisfies the following relationship:

$p \geq a$ when $L < a^2/\lambda$, where L is the distance between the movable scale and a light beam emitting surface of the surface-emitting semiconductor laser light-source, $\lambda$ is a wavelength of the light beam, p is a scale pitch, a is an opening length of the surface-emitting laser measured along the pitch direction of the scale.

Function

In this present invention, light emitted from a surface-emitting semiconductor laser light-source is radiated onto the scale and reflected by the scale or transmitted through the scale and then received by a photodetector. As a result, the moving distance of the scale can be measured.

Effect

Because an emission window of the laser can be designed in a wide range using a surface-emitting semiconductor laser light-source, it is possible to realize an encoder having a construction with $L \geq a^2/\lambda$, in such a way that it produces a desired resolution even if it does not have a lens or an immobilized slit. In particular, an encoder having a small scale pitch can be realized without a lens. Consequently, a high resolution optical encoder can be miniaturized and manufactured through simple steps at low cost.

4. Structural Constitution

An optical encoder comprising a mobile scale movable relative to a light-source, a surface emitting semiconductor laser light-source for radiating a part of the movable scale, and a photodetector for receiving reflection light by the movable scale or transmission light through the movable scale, in which the optical encoder satisfies the following relationship:

$p_1 \geq \lambda \cdot L/a_1$ when $L \geq a_1^2/\lambda$ $p_2 \geq \lambda \cdot L/a_2$ when $L \geq a_2^2/\lambda$ $p_1 \geq a_1$ when $L < a_1^2/\lambda$ $p_2 \geq a_2$ when $L < a_2^2/\lambda$ where L is the distance between the mobile scale and a light beam emitting surface of the surface-emitting semiconductor laser light-source, $\lambda$ is a wavelength of light beam $p_1$ and $p_2$ are pitches of the scales having different specific direction, and $a_1$ and $a_2$ are opening lengths of a beam diameter at the radiation window of a surface-emitting laser corresponding to the direction of pitches $p_1$ and $p_2$.

Function

In this present invention, light emitted from a surface-emitting semiconductor laser light-source is radiated onto a scale having a two-dimensional patterns having a different reflectivity or transmissivity and reflected by the scale or transmitted through the scale and then received by a photodetector. As a result, the moving distance of the scale can be measured in the two-dimensions.

Effect

Since an emission window diameter of the laser can be designed in a wide range using a surface-emitting semiconductor laser light-source, it is possible to realize an encoder in such a way that it has a desired resolution even if it does not have a lens or an immobilized slit. In particular, an encoder having a small scale pitch can be realized without a lens. Consequently, a high resolution optical encoder can be miniaturized and manufactured through simple steps at low cost.

5.

An optical encoder having the structural constitution of 1, 2, 3 or 4 mentioned above, which comprises a semiconductor laser light-source arranged on a tilted surface partially formed in a substrate. The tilted surface of the substrate may be formed by means of any method including chemical etching, mechanical cutting, and the like.

Function

In the optical encoder having the above-mentioned structural constitution, a semiconductor light-source, which emits light from the thin film surface thereof, is mounted on the tilted surface partially formed on the substrate and the light emitted from the light source is reflected by a scale and received by a light receiving element.

Effect

The substrate can be positioned parallel to the scale. As a result, the overall thickness of the encoder can be increased.

6.

An optical encoder comprising a photodetector element placed at a desired position to receive zero-order diffraction light by a scale.

Function

In the optical encoder having the above-mentioned structural constitution a semiconductor light-source, which emits light from the thin film surface thereof, is positioned on a tilted surface partially formed on the substrate and the emission light from the light source is reflected by the scale and a photodetector receives zero-order diffraction light thereof.

Effect

Since the photodetector can receive zero-order diffraction light, highly permissible signals independent on a pitch accuracy and reflectivity accuracy.

7.

An optical encoder having the structural constitution of 1, 2, 3 and 4 mentioned above, in which the shape of the emitting light beam from a light source is an ellipse or a rectangle and the main axis of which is perpendicular to the direction of scale pitch.

Function

In the optical encoder having the above-mentioned structural constitution, the emission light from the light source is reflected by a scale and a photodetector receives the reflection light.

Effect

Signal light amount can be increased without lowering resolution of the scale. As a result, signals having satisfactory S/N can be detected.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical encoder comprising:
   a movable scale which is movable relative to a light source,
   a surface-emitting semiconductor laser light-source for radiating light to a part of said movable scale, without any lenses or slits provided between said movable scale and said surface-emitting semiconductor laser light-source, and
   a photodetector for detecting light reflected by said movable scale or light transmitted through said movable scale.

2. The optical encoder according to claim 1, wherein said surface-emitting semiconductor laser light-source is positioned such that a laser beam emitted from said surface-emitting semiconductor laser light-source directly irradiates said movable scale via no beam-shaping optical members.

3. The optical encoder according to claim 1, wherein;
   said surface-emitting semiconductor laser is arranged on a tilted surface partially formed on a substrate; and
   said photodetector is arranged on said substrate.

4. The optical encoder according to claim 1, wherein;
   said surface-emitting semiconductor laser is arranged on the substrate on which said photodetector is arranged; and
   said photodetector is positioned so as to receive zero-order diffraction light reflected by said movable scale.

5. The optical encoder according to claim 1, wherein an optical beam shape of light, at the radiation surface of said surface-emitting semiconductor laser light-source, is one of an ellipse and a rectangle having a main axis perpendicular to a direction of scale pitch.

6. An optical encoder comprising:
   a movable scale movable relative to a light source,
   a surface-emitting semiconductor laser light-source for radiating a part of said movable scale, and
   a photodetector for detecting light reflected by said movable scale or light transmitted through said movable scale,
   wherein said optical encoder satisfies the following relationship:

$p \geq \lambda \cdot L/a$, when $L \geq a^2/\lambda$, where L is the distance between said movable scale and a light beam emitting surface of said surface-emitting semiconductor laser light-source, $\lambda$ is a wavelength of a light beam, p is a scale pitch, and a is a beam diameter at the radiation window of said light source measured along a pitch direction of said scale.

7. The optical encoder according to claim 6, wherein said surface-emitting semiconductor laser light-source is positioned on a tilted surface partially formed on a substrate.

8. The optical encoder according to claim 6, wherein the substrate on which said surface-emitting semiconductor laser light-source is positioned comprises a semiconductor substrate in which said photodetector is formed.

9. The optical encoder according to claim 6, wherein said photodetector is positioned so as to receive zero-order diffraction light reflected by said movable scale.

10. The optical encoder according to claim 6, wherein a beam shape of light emitted from said light source is an ellipse or a rectangle having a main axis perpendicular to a direction of the scale pitch.

11. An optical encoder comprising:
    a movable scale movable relative to a light source,
    a surface emitting semiconductor laser light-source for radiating a part of said movable scale, and
    a photodetector for detecting light reflected by said movable scale or light transmitted through from said movable scale,
    wherein said optical encoder satisfies the following relationship:

$p \geq a$, when $L < a^2/\lambda$, where L is a distance between said movable scale and a light beam emitting surface of said surface-emitting semiconductor laser light-source, $\lambda$ is a wavelength of a light beam, p is a scale pitch, and a is a beam diameter at the radiation window of said light source measured along a pitch direction of said scale.

12. The optical encoder according to claim 11 wherein said surface-emitting semiconductor laser light-source is positioned on a tilted surface partially formed on a substrate.

13. The optical encoder according to claim 11, wherein the substrate on which said surface-emitting semiconductor laser light-source is positioned is a semiconductor substrate in which said photodetector is formed.

14. The optical encoder according to claim 11, wherein said photodetector is positioned so as to receive zero-order diffraction light reflected by said movable scale.

15. The optical encoder according to claim 11, wherein a beam shape of light emitted from said light source is an ellipse or a rectangle having a main axis perpendicular to a direction of the scale pitch.

16. An optical encoder comprising:
    a movable scale movable relative to a light source,
    a surface emitting semiconductor laser light-source for radiating a part of said movable scale, and
    a photodetector for detecting light reflected by said movable scale or light transmitted through said movable scale,
    wherein said optical encoder satisfies the following relationship:

$p_1 \geq \lambda \cdot L/a_1$, when $L \geq a_1^2/\lambda$ $p_2 \geq \lambda \cdot L/a_2$, when $L \geq a_2^2/\lambda$ $p_1 \geq a_1$, when $L < a_1^2/\lambda$ $p_2 \geq a_2$, when $L < a_2^2/\lambda$ where L is a distance between said movable scale and a light beam emitting surface of said surface-emitting semiconductor laser light-source, $\lambda$ is a wavelength of light beam, $p_1$ and $p_2$ are pitches of said movable scale having different specific direction, and $a_1$ and $a_2$ are respective beam diameters at the radiation window of said light source corresponding to the direction of pitches $p_1$ and $p_2$.

17. The optical encoder according to claim 16, wherein said surface-emitting semiconductor laser light-source is positioned on a tilted surface partially formed on a substrate.

18. The optical encoder according to claim 16, wherein the substrate on which said surface-emitting semiconductor laser light-source is positioned comprises a semiconductor substrate in which said photodetector is formed.

19. The optical encoder according to claim 16, wherein said photodetector is positioned so as to receive zero-order diffraction light reflected by said movable scale.

20. The optical encoder according to claim 16, wherein a beam shape of light emitted from said light source is one of an ellipse and a rectangle having a main axis perpendicular to a direction of the scale pitch.

* * * * *

UNITED STATES PATENT AND TRADEMARK OFFICE
CERTIFICATE OF CORRECTION

PATENT NO. : 5,671,052
DATED : September 23, 1997
INVENTOR(S) : KAWAKUBO et al.

It is certified that error appears in the above-identified patent and that said Letters Patent is hereby corrected as shown below:

Title page, replace the drawing of Fig.4 shown on the title page with the attached amended Fig 4.

In the Drawings:

Figs. 1, 3, 4 and 18, replace the sheets containing these drawing figures with the attached amended sheets containing amended Figs 1, 3, 4 and 18.

Signed and Sealed this

Twenty-sixth Day of October, 1999

Attest:

Q. TODD DICKINSON

*Attesting Officer*          *Acting Commissioner of Patents and Trademarks*

United States Patent [19]
Kawakubo et al.

[11] Patent Number: 5,671,052
[45] Date of Patent: Sep. 23, 1997

[54] OPTICAL ENCODER

[75] Inventors: Isao Kawakubo, Hino; Eiji Yamamoto, Ome, both of Japan

[73] Assignee: Olympus Optical Co., Ltd., Tokyo, Japan

[21] Appl. No.: 402,637

[22] Filed: Mar. 13, 1995

[30] Foreign Application Priority Data

Mar. 15, 1994 [JP] Japan ............................ 6-043656
Feb. 20, 1995 [JP] Japan ............................ 7-030938

[51] Int. Cl.$^6$ .................................. G01B 11/14
[52] U.S. Cl. ................... 356/373; 356/374; 356/376
[58] Field of Search .................... 356/376, 374, 356/373; 257/82, 79, 80, 81

[56] References Cited

U.S. PATENT DOCUMENTS 3,881,113  4/1975  Rideout et al. .................. 257/82
5,129,725  7/1992  Ishizuka et al. ................ 356/374

FOREIGN PATENT DOCUMENTS 62-200224  9/1987  Japan.

OTHER PUBLICATIONS

Nikkei Mechanical, Jul. 1988; pp. 54–62.

Primary Examiner—Frank G. Font
Assistant Examiner—Reginald A. Ratliff
Attorney, Agent, or Firm—Frishauf, Holtz, Goodman, Langer & Chick

[57] ABSTRACT

An optical encoder comprising a movable scale moving relatively to a light source, a surface-emitting semiconductor laser light-source for radiating a part of the movable scale, and a photodetector for receiving reflection light by the movable scale or transmission light through the movable scale.

20 Claims, 9 Drawing Sheets

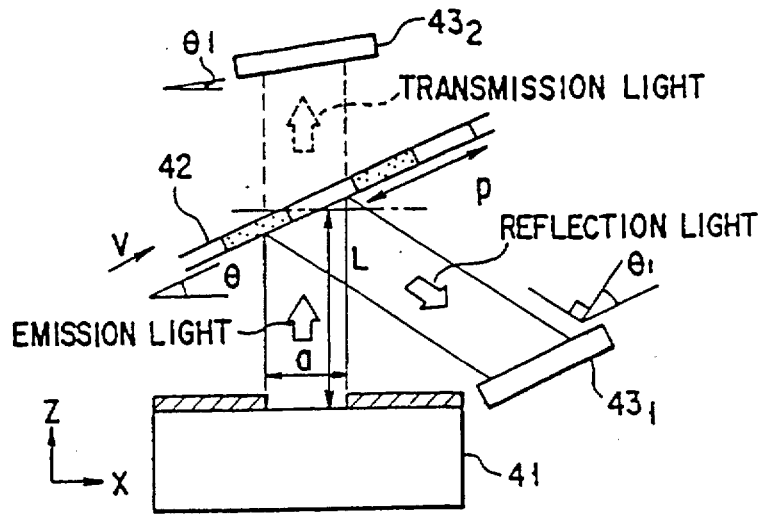

FIG. 4

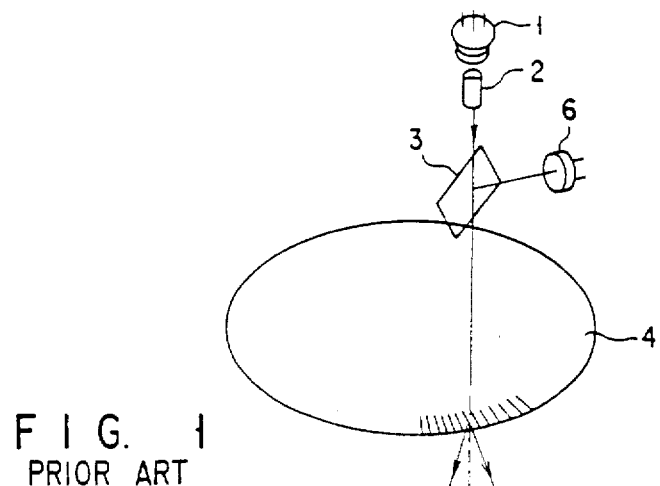
FIG. 1
PRIOR ART
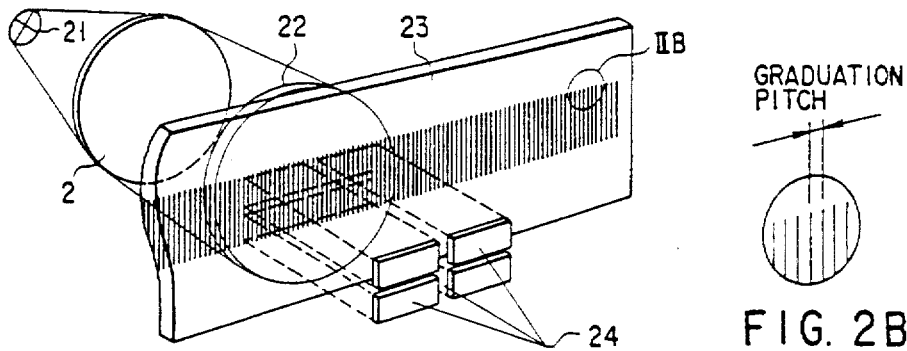
FIG. 2A
PRIOR ART
FIG. 2B
PRIOR ART
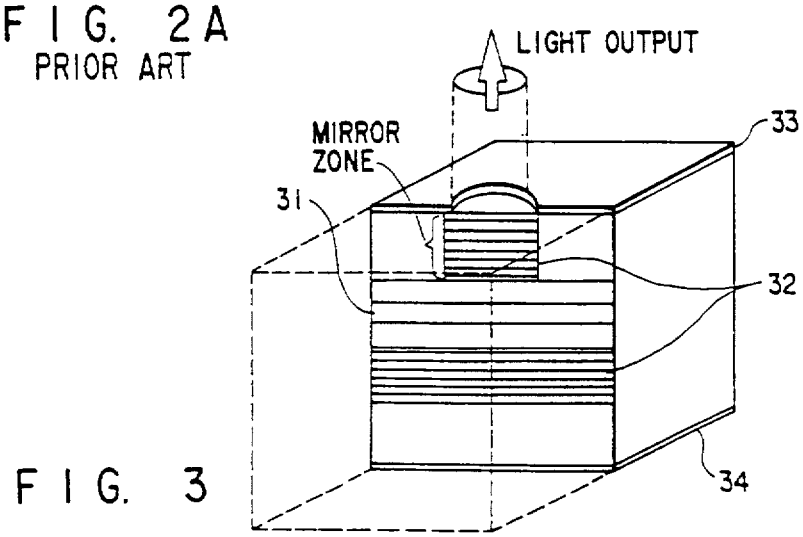
FIG. 3

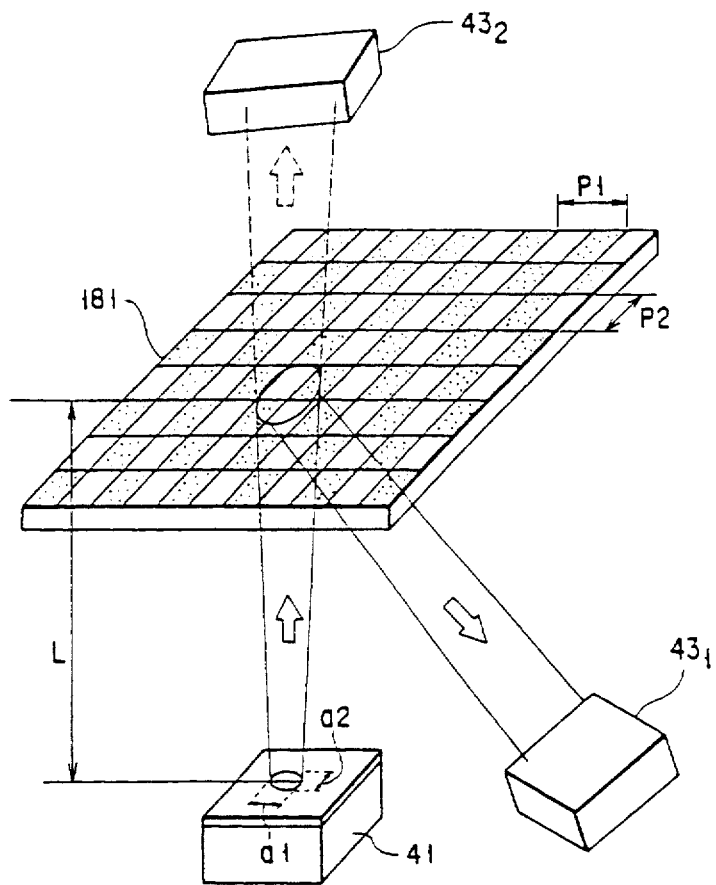
F I G. 18